(12) United States Patent
Sawano et al.

(10) Patent No.: US 6,210,804 B1
(45) Date of Patent: *Apr. 3, 2001

(54) DIRECT HEAT-SENSITIVE RECORDING METHOD AND DEVICE

(75) Inventors: Mitsuru Sawano; Toshimasa Usami, both of Shizuoka (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,194

(22) Filed: Dec. 24, 1997

(30) Foreign Application Priority Data

Dec. 26, 1996 (JP) ...................................... 8-348523
Nov. 6, 1997 (JP) ...................................... 9-304545

(51) Int. Cl.[7] .................................................... B32B 27/00
(52) U.S. Cl. ....................... 428/425.9; 428/432; 428/417; 428/402.2
(58) Field of Search ............................ 428/402.24, 402.2, 428/417, 421, 426, 432, 425.9; 430/5, 204, 205, 209, 218; 503/202; 427/214, 217, 218

*Primary Examiner*—Merrick Dixon
(74) *Attorney, Agent, or Firm*—Sughrue, Mion, Zinn, Macpeak & Seas, PLLC

(57) ABSTRACT

A direct heat-sensitive recording method and device using a light-fixing-type heat-sensitive recording material in which are layered on a support a heat-sensitive recording layer and at least one light-fixing-type heat-sensitive recording layer, which have heat recording sensitivities higher than a heat recording sensitivity of the heat-sensitive recording layer and which are fixed by electromagnetic waves of respectively different wavelengths, each layer of the light-fixing-type heat-sensitive recording material developing to a respectively different color, including: an exposing device for deactivating imagewise each of the light-fixing-type heat-sensitive recording layers corresponding to respective colors by modulating light amounts of electromagnetic waves having respectively different wavelengths and illuminating the electromagnetic waves onto the light-fixing-type heat-sensitive recording layer; and a heat recording device for developing the heat-sensitive recording layer imagewise and developing undeactivated portions of the light-fixing-type heat-sensitive recording layer by applying to the light-fixing-type heat-sensitive recording material heat energy needed to develop the heat-sensitive recording layer.

10 Claims, 16 Drawing Sheets

F I G. 3
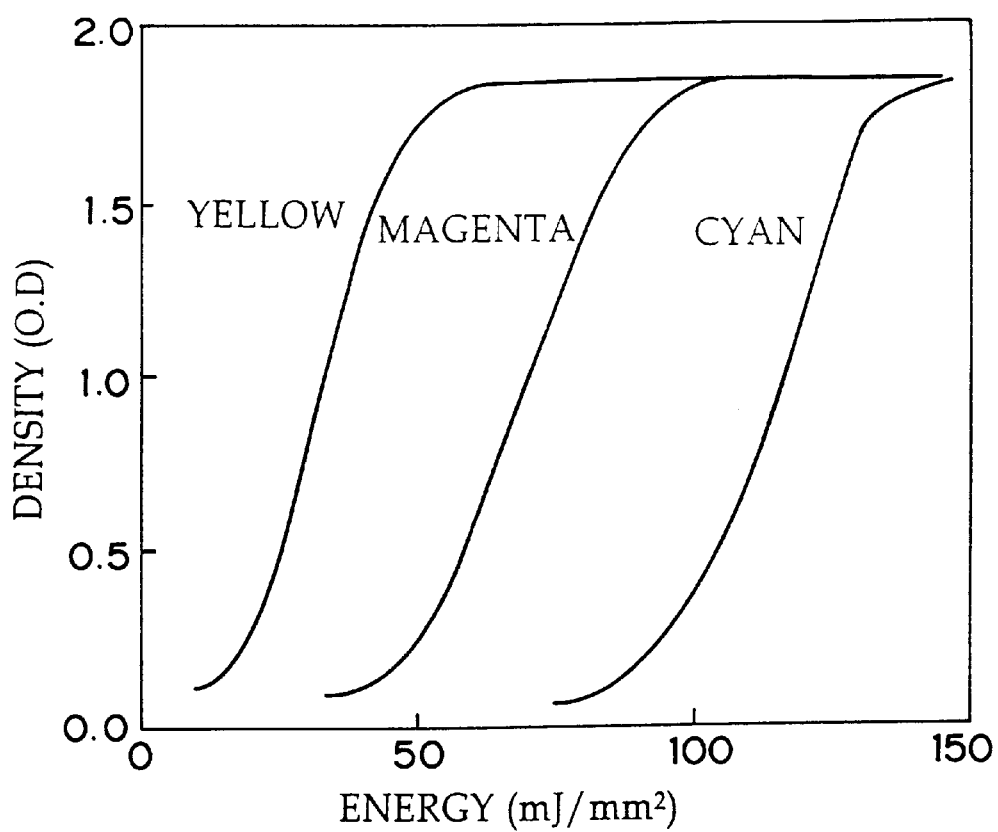
HEAT RECORDING CHARACTERISTICS
OF RECORDING MATERIAL

F I G. 4
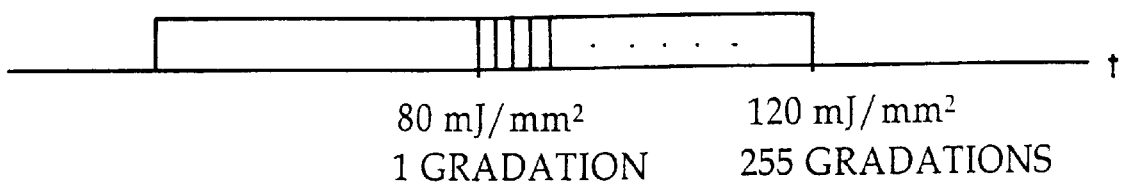
80 mJ/mm²     120 mJ/mm²
1 GRADATION     255 GRADATIONS
F I G. 5
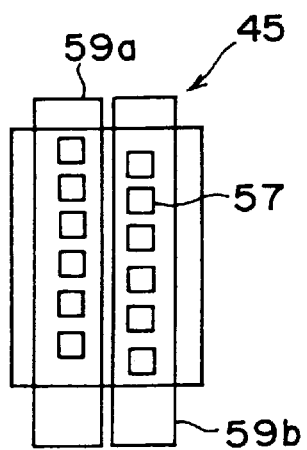

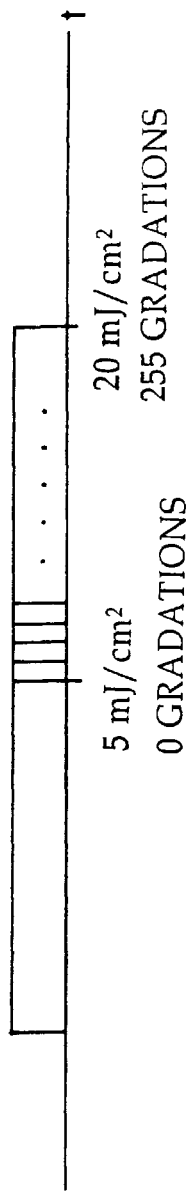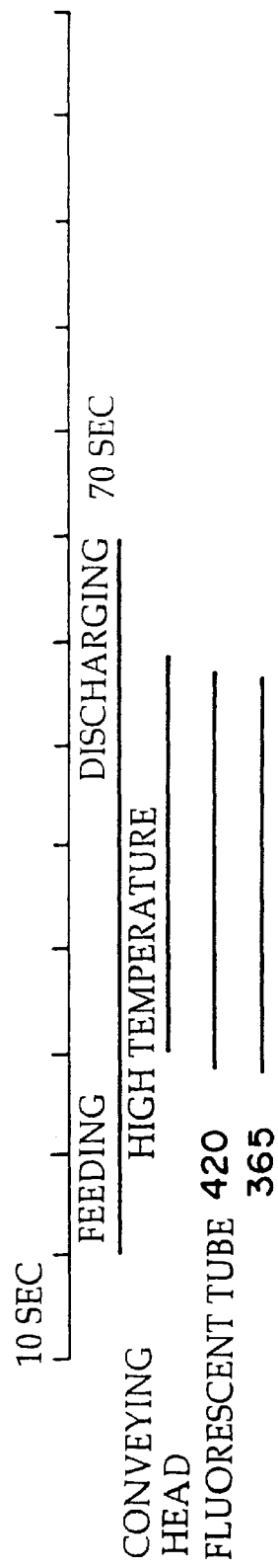

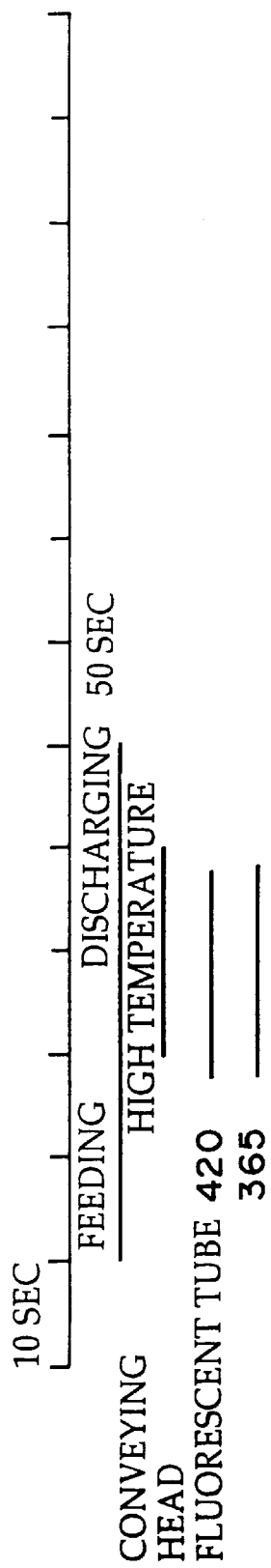

F I G. 1 2
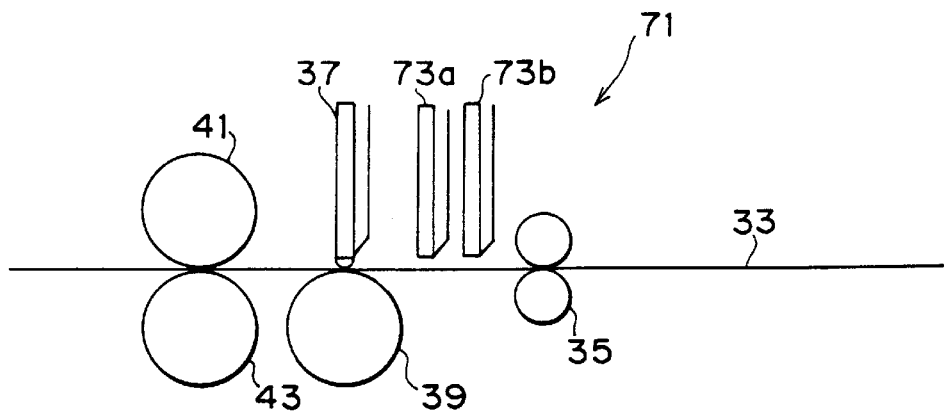
F I G. 1 3
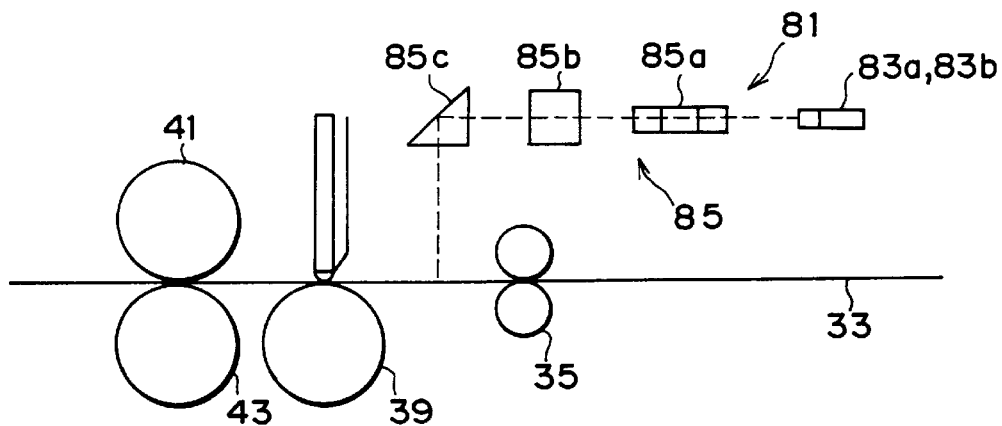
F I G. 1 4
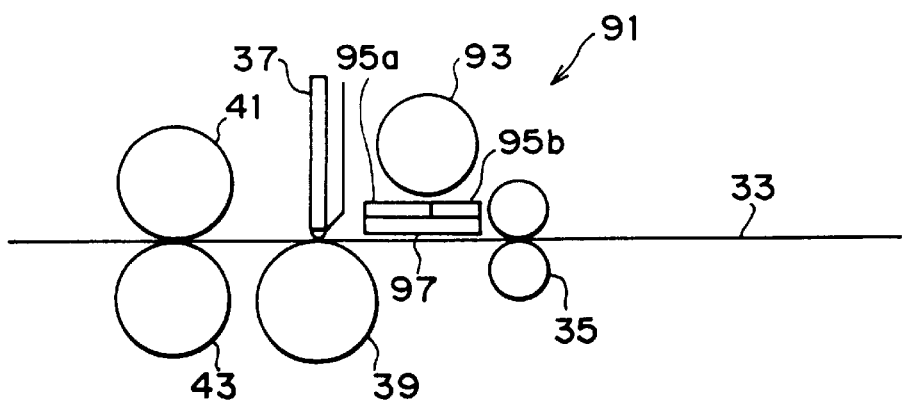

F I G. 1 5
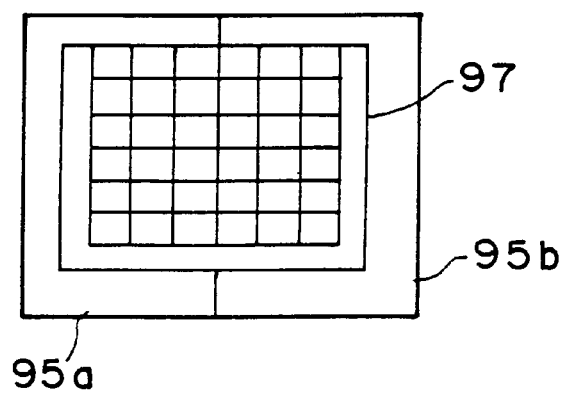
F I G. 1 6
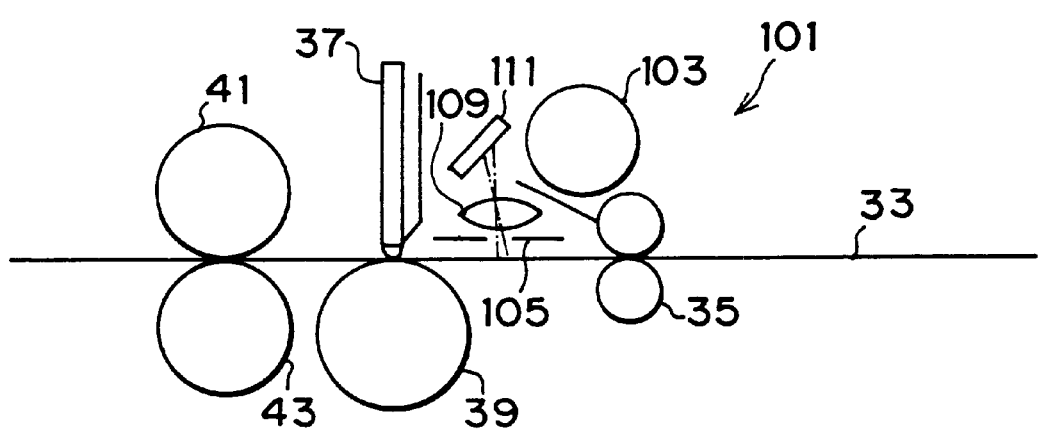

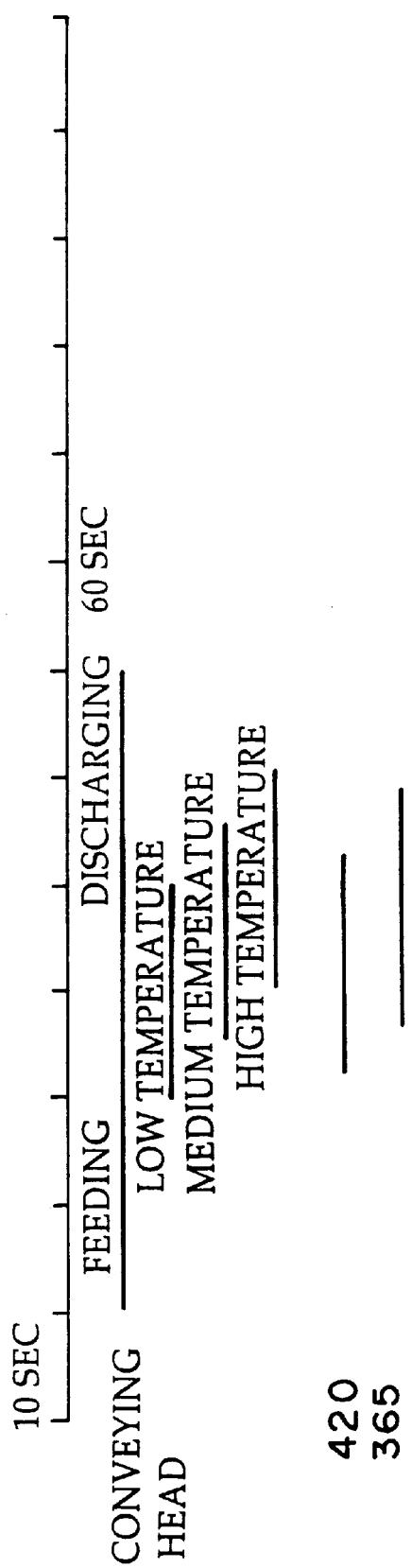

DIRECT HEAT-SENSITIVE RECORDING METHOD AND DEVICE

BACKGROUND OF THE INVENTION

1. Field of the Invention

The present invention relates to a direct heat-sensitive recording method and device using a light-fixing-type heat-sensitive recording material.

2. Description of the Related Art

In heat recording, there is a heat transfer recording method and a heat-sensitive recording method. As compared with the heat transfer recording method, the heat-sensitive recording method is advantageous in that waste matter is not generated and the running costs are low. In order to carry out full color recording by using the heat-sensitive recording method, the three colors of yellow, magenta and cyan must be recorded independently. For example, there is a method in which heat-sensitive recording layers, which develop to different colors and have different heat recording sensitivities, are layered one upon the other, and the colors thereof are respectively formed by the magnitude of the heat. However, in this case, when the second color is recorded, the first color is formed. Therefore, a drawback arises in that it is not possible to form only the second color, and only the third color.

In order to overcome this drawback, a heat-sensitive recording method has been proposed which makes independent recording of the three colors possible by the introduction of a fixing process which is such that, when the second color is recorded, the first color is not formed, and when the third color is recorded, the second color is not formed.

As illustrated in FIG. 18, an image recording device 1 which effects full color recording in accordance with this method includes guide rollers 5 for guiding a color heat-sensitive recording material ("recording material") 3 to a recording section, a thermal head 7 and a platen roller 9 which are provided at the recording section, a pinch roller 11 and a capstan roller 13 which convey the recording material 3 in forward and reverse directions, and two fluorescent lamps 15a, 15b for exposure at different wavelengths (420 nm, 365 nm).

The processes of the full color recording carried out by the image recording device 1 are described hereinafter with reference to FIGS. 19 and 20. First, a yellow layer 17 of the supplied recording material 3 is developed (the color thereof is formed) by a low-energy amount of heat corresponding to recording information for the yellow layer 17. Thereafter, while the recording material 3 is conveyed in the reverse direction, the yellow layer 17 is light-fixed by ultraviolet light of 420 nm.

Next, while the recording material 3 is being conveyed in the forward direction again, the magenta layer 19 is developed by a medium-energy amount of heat corresponding to recording information for the magenta layer 19. Thereafter, while the recording material 3 is again conveyed in the reverse direction, the magenta layer 19 is light-fixed by ultraviolet light of 365 nm.

Finally, while the recording material 3 is again being conveyed in the forward direction, the cyan layer 21 is developed by a high-energy amount of heat corresponding to recording information for the cyan layer 21. The recording of three independent colors, i.e., full color recording, is thus completed.

FIG. 21 illustrates another image recording device 23. In this structure, three thermal heads 25a, 25b, 25c, which supply low-energy, medium-energy, and high-energy amounts of heat respectively, are disposed in order along the feeding direction of the recording material 3. A fluorescent lamp 27a of 420 nm is disposed between the low-temperature thermal head 25a and the medium-temperature thermal head 25b. A fluorescent lamp 27b of 365 nm is disposed between the medium-temperature thermal head 25b and the high-temperature thermal head 25c.

The processes of the full color recording carried out by this image recording device 23 are as follows, as illustrated in FIG. 22. First, the yellow layer 17 of the supplied recording material 3 is developed by the low-temperature thermal head 25a.

Immediately thereafter, the yellow layer 17 is light-fixed by the ultraviolet light of 420 nm. Next, the magenta layer 19 is developed by the medium-temperature thermal head 25b. Immediately thereafter, the magenta layer 19 is light-fixed by the ultraviolet light of 365 nm. Finally, the cyan layer 21 is developed by the high-temperature thermal head 25c. Thus, the full color recording of the recording material 3 is completed by conveying the recording material 3 one time in the feeding direction thereof.

However, in the image recording device 1 illustrated in FIG. 18, the recording material 3 which has been conveyed once must be conveyed in the reverse direction, so as to pass by the thermal head 7 three times. Therefore, a drawback arises in that an image cannot be recorded on the recording material at high speed. Further, in the image recording device 1, because the number of times the recording material 3 contacts the thermal head 7 is large, it is easy for the recording material 3 to be damaged or for portions of the recording material to not develop due to dirt or the like adhering thereto. Further, because the recording material 3 is conveyed plural times, there is also the problem of the registration shifting greatly.

Moreover, in the image recording device 23 illustrated in FIG. 21, although recording is completed by the recording material 3 being conveyed one time in the feeding direction, it is necessary to provide the three thermal heads 25a, 25b, 25c. Drawbacks arise in that the cost of the device increases, and the device becomes large. Further, in the image recording device 23, another drawback arises in that, because color formation by the low-temperature thermal head 25a is started after the leading end of the recording material 3 has reached the pinch roller 11, the blank space before recording begins is large.

SUMMARY OF THE INVENTION

In view of the aforementioned, an object of the present invention is to provide a direct heat-sensitive recording method and device using a light-fixing-type heat-sensitive recording material, which device and method enable high-speed recording of an image onto a recording material, and in which the structure of the device is compact and inexpensive.

In order to achieve the above-described object, the present invention provides a direct heat-sensitive recording method using a light-fixing-type heat-sensitive recording material in which are layered on a support a heat-sensitive recording layer and at least one light-fixing-type heat-sensitive recording layer, which have heat recording sensitivities higher than a heat recording sensitivity of the heat-sensitive recording layer and which are fixed by electromagnetic waves of respectively different wavelengths, each layer of the light-fixing-type heat-sensitive recording material developing to a respectively different color, comprising: a step of deactivating imagewise each of the light-fixing-type heat-sensitive recording layers corresponding to respective colors by modulating light amounts of electromagnetic waves having respectively different wavelengths and illuminating the electromagnetic waves onto the light-fixing-type heat-sensitive recording layer; and a step of developing the heat-sensitive recording layer imagewise and developing undeactivated portions of the light-fixing-type heat-sensitive recording layer by applying to the light-fixing-type heat-sensitive recording material heat energy needed to develop the heat-sensitive recording layer.

The heat amount of the heat energy applied to the light-fixing-type heat-sensitive recording material may be modulated on the basis of heat energy which is less than the minimum heat energy needed to develop the heat-sensitive recording layer and which can develop the light-fixing-type heat-sensitive recording layer.

The present invention also provides a direct heat-sensitive recording device using a light-fixing-type heat-sensitive recording material in which are layered on a support a heat-sensitive recording layer and at least one light-fixing-type heat-sensitive recording layer, which have heat recording sensitivities higher than a heat recording sensitivity of the heat-sensitive recording layer and which are fixed by electromagnetic waves of respectively different wavelengths, each layer of the light-fixing-type heat-sensitive recording material developing to a respectively different color, comprising: exposing means for deactivating imagewise each of the light-fixing-type heat-sensitive recording layers corresponding to respective colors by modulating light amounts of electromagnetic waves having respectively different wavelengths and illuminating the electromagnetic waves onto the light-fixing-type heat-sensitive recording layer; and heat recording means for developing the heat-sensitive recording layer imagewise and developing undeactivated portions of the light-fixing-type heat-sensitive recording layer by applying to the light-fixing-type heat-sensitive recording material heat energy needed to develop the heat-sensitive recording layer.

The heat amount of the heat energy applied to the light-fixing-type heat-sensitive recording material may be modulated on the basis of heat energy which is less than the minimum heat energy needed to develop the heat-sensitive recording layer and which can develop the light-fixing-type heat-sensitive recording layer.

The exposing means may comprise: a fluorescent tube; filters separating light from the fluorescent tube into the electromagnetic waves having respectively different wavelengths; and a plurality of light-emitting portions which are arranged linearly in a main scanning direction for each of the filters.

The exposing means may comprise a plurality of fluorescent substance light-emitting elements which are arranged linearly in a main scanning direction for each of the electromagnetic waves having respectively different wavelengths.

The exposing means may comprise a plurality of LED light-emitting elements which are arranged linearly in a main scanning direction for each of the electromagnetic waves having respectively different wavelengths. The exposing means may comprise: laser light-emitting elements which modulate a laser beam in accordance with recording information; and an optical system which scans a modulated laser beam onto the light-fixing-type heat-sensitive recording material.

The exposing means may comprise a linear-light-emitting means and a line control element. The line control element may be a liquid crystal matrix. Or, the line control element may be an active semiconductor device having a plurality of mirrors which can be displaced or can deflect electromagnetic waves and which are arranged linearly in a main scanning direction.

In the direct heat-sensitive recording method, first, each of the light-fixing-type heat-sensitive recording layers is deactivated imagewise, in accordance with the recording information, by the amounts of light of the electromagnetic waves having respectively different wavelengths being modulated and the electromagnetic waves being illuminated onto the light-fixing-type heat-sensitive recording material. Thereafter, an amount of heat needed to develop the heat-sensitive recording layer is applied. Here, if necessary, the amount of heat may be modulated on the basis of heat energy, which is less than the minimum heat energy needed to develop the heat-sensitive recording layer and which is able to develop the light-fixing-type heat-sensitive recording layers. The light-fixing-type heat-sensitive recording layers and the heat-sensitive recording layer can thereby be developed at one time. As a result, there is no need to convey the recording material reversely or provide a plurality of heat recording means. High speed recording of an image onto a recording material is made possible by a compact and inexpensive device.

Further, the direct heat-sensitive recording device includes exposing means for deactivating imagewise each of the light-fixing-type heat-sensitive recording layers corresponding to respective colors by modulating light amounts of electromagnetic waves having respectively different wavelengths and illuminating the electromagnetic waves onto the light-fixing-type heat-sensitive recording material; and heat recording means for developing the heat-sensitive recording layer imagewise and developing undeactivated portions of the light-fixing-type heat-sensitive recording layers by applying to the light-fixing-type heat-sensitive recording material heat energy whose heat amount has been modulated on the basis of heat energy, which is less than the minimum heat energy needed to develop the heat-sensitive recording layer and which can develop the light-fixing-type heat-sensitive recording layers. Light-fixing of the light-fixing-type heat-sensitive recording layers and color formation of the light-fixing-type heat-sensitive recording layers and the heat-sensitive recording layer can be carried out by the light-fixing-type heat-sensitive recording material being conveyed at one time.

The structure of the direct heat-sensitive recording device, whose exposing means is structured by a fluorescent tube, a filter, and a plurality of light-emitting portions, is simple, and expensive parts are not required. Therefore, the device is less expensive.

In the direct heat-sensitive recording device whose exposing means is fluorescent substance light-emitting elements, a light source can be provided for each electromagnetic wave, and a sufficient amount of emitted light can be obtained. Therefore, an image can be recorded onto a recording material at an even higher speed.

In the direct heat-sensitive recording device whose exposing means is LED light-emitting elements, a sufficient amount of emitted light can be obtained, an image can be recorded onto a recording material at high speed, and the exposing means can be made compact. Therefore, the device can be made more compact.

In the direct heat-sensitive recording device whose exposing means is formed by a laser light-emitting element and an optical system, it is possible to carry out scanning by a thin laser beam. Therefore, a high resolution can be obtained.

In the direct heat-sensitive recording device whose exposing means is formed by a linear-light-emitting means and a line control element, the driving of the line control element is controlled in accordance with recording information, so that the number of scans is small. Therefore, the exposure time can be shortened.

Further, in the direct heat-sensitive recording device in which the line control element is a liquid crystal matrix, the line control element can be driven by a low voltage and low electric power.

Moreover, in a direct-heat-sensitive recording device in which the line control element is an active semiconductor device having a plurality of mirrors, mirrors which are disposed at minute intervals and which have high reflectivity and high aperture ratios are driven. Therefore, the energy efficiency can be increased, and a high resolution can be obtained.

In a direct heat-sensitive recording device whose heat recording means is a thermal head whose energization time is controllable and which has a plurality of heat-emitting elements arranged linearly in a main scanning direction, by controlling the energization time, the amount of heat is easily modulated so as to develop the heat-sensitive recording layer and the undeactivated portions of the light-fixing-type heat-sensitive recording layers.

BRIEF DESCRIPTION OF THE DRAWINGS

FIG. 3 is a graph illustrating heat recording characteristics of the recording material.

FIG. 4 is a diagram for explaining heat control at the device of FIG. 1.

FIG. 5 is a plan view of a fluorescent tube print head portion of FIG. 1.

FIG. 6 is a diagram for explaining light amount control of the device of FIG. 1.

FIG. 7 is a time chart of recording processes using the device of FIG. 1.

FIG. 11 is a time chart of recording processes using the device of FIG. 9.

FIG. 12 is a schematic structural view of an image recording device relating to a third embodiment of the present invention.

FIG. 13 is a schematic structural view of an image recording device relating to a fourth embodiment of the present invention.

FIG. 14 is a schematic structural view of an image recording device relating to a fifth embodiment of the present invention.

FIG. 15 is a plan view of a line control means of FIG. 14.

FIG. 16 is a schematic structural view of an image recording device relating to a sixth embodiment of the present invention.

FIG. 22 is a time chart of recording processes using the device of FIG. 21.

DESCRIPTION OF THE PREFERRED EMBODIMENTS

Preferred embodiments of the direct heat-sensitive recording method and device relating to the present invention will be described hereinafter with reference to the drawings.

Figure 1:
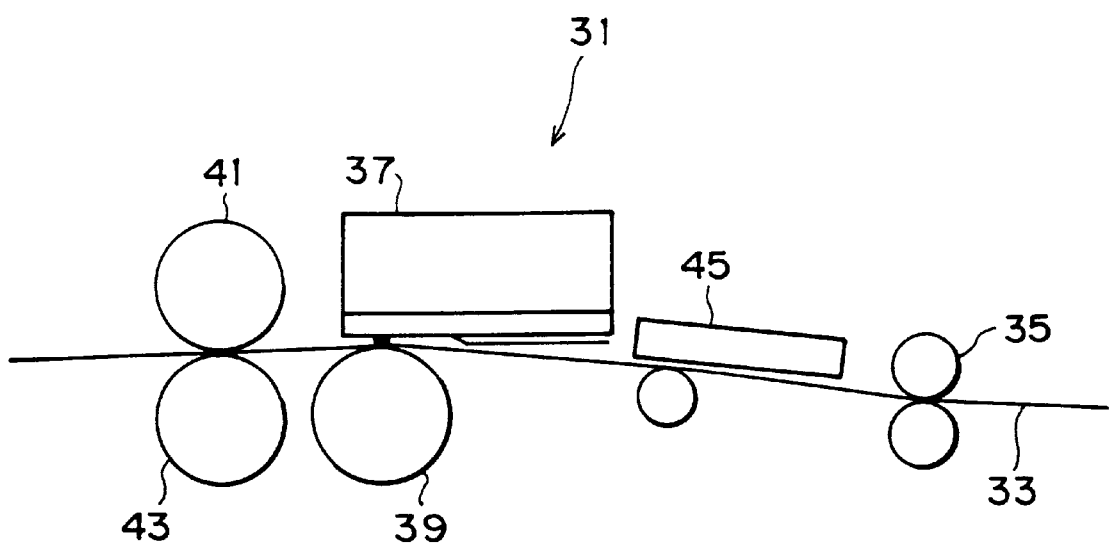
FIG. 1 is a schematic structural view of an image recording device relating to a first embodiment of the present invention.

FIG. 1 is a schematic structural view of a direct heat-sensitive recording device relating to a first embodiment of the present invention. The direct heat-sensitive recording device ("recording device") 31 includes, as main structural members, guide rollers 35 for guiding to a recording section a light-fixing-type heat-sensitive recording material ("recording material") 33, a heat recording means (thermal head) 37 and a platen roller 39 provided at the recording section, a pinch roller 41 and a capstan roller 43 which convey the recording material 33 in the forward direction, and an exposing means (a fluorescent tube print head) 45 provided between the thermal head 37 and the guide rollers 35.

Hereinafter, the recording material 33 used in the recording device 31 will be described.

Figure 2:
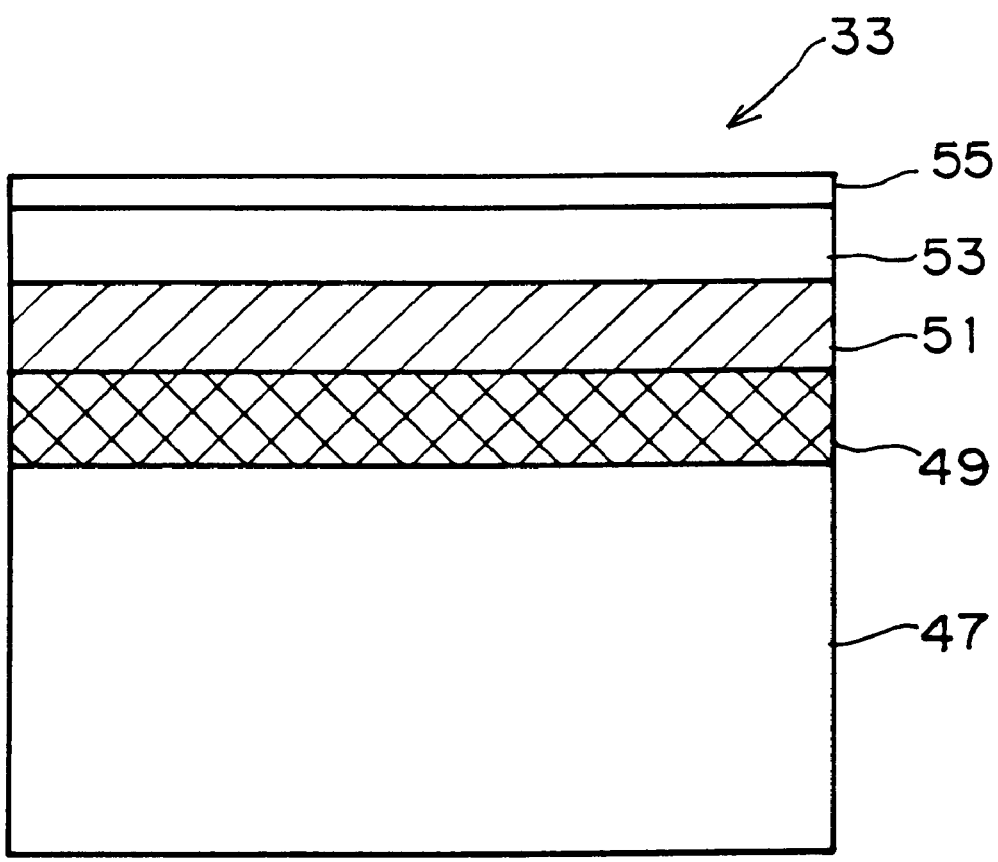
FIG. 2 is a diagram for explaining an example of a layer structure of a recording material.

FIG. 2 is a diagram for explaining an example of a layer structure of the recording material 33. In the recording material 33, a cyan heat-sensitive recording layer 49, a magenta heat-sensitive recording layer 51, a yellow heat-sensitive recording layer 53, and a heat-resistant protective layer 55 are successively layered on a support 47.

The cyan heat-sensitive recording layer 49 includes, as main components thereof, an electron-donating dye precursor and an electron-accepting compound. When heated, the cyan heat-sensitive recording layer 49 is developed such that the cyan color thereof is formed.

The magenta heat-sensitive recording layer 51 includes a diazonium salt compound having a maximum absorption wavelength of around 365 nm, and a coupler which thermally reacts with the diazonium salt compound to form the magenta color. When ultraviolet light in a vicinity of 365 nm is illuminated onto the magenta heat-sensitive recording layer 51, the diazonium salt compound photodissociates and the color forming ability is lost in accordance with the amount of light.

The yellow heat-sensitive recording layer 53 includes a diazonium salt compound having a maximum absorption wavelength of around 420 nm, and a coupler which thermally reacts with the diazonium salt compound to form the yellow color. When ultraviolet light in a vicinity of 420 nm is illuminated onto the yellow heat-sensitive recording layer 53, the diazonium salt compound photodisassociates and the color forming ability is lost in accordance with the amount of the light.

FIG. 3 is a graph illustrating the heat recording characteristics of the recording material. Heat energy on the horizontal axis expresses the heat energy generated from a heat-generating element. The heat energy for color formation of the yellow heat-sensitive recording layer 53 is set to be the lowest, whereas the heat energy for color formation of the cyan heat-sensitive recording layer 49 is set to be the highest. It is preferable that the cyan heat-sensitive recording layer 49 does not develop at the amount of heat at which the yellow heat-sensitive recording layer 53 or the magenta heat-sensitive recording layer 51 develops. In the present embodiment, the amount of heat at which the yellow heat-sensitive recording layer 53 develops and the amount of heat at which the magenta heat-sensitive recording layer 51 develops may be near one another or may be the same.

FIG. 4 is a diagram for explaining heat control at the device of FIG. 1. In the thermal head 37, a plurality of heat-emitting elements such as are known are arrayed in a line in the main scanning direction.

When the gradation of the image of the cyan heat-sensitive recording layer 49 (the third color) is zero, in order for the thermal head 37 to develop the image of the yellow heat-sensitive recording layer 53 (the first color) and the image of the magenta heat-sensitive recording layer 51 (the second color), the thermal head 37 is controlled, by modulation of the energization time, to supply to the recording material 33 an amount of heat which is less than the minimum amount of heat required to form at least the third color and which enables formation of the first color and the second color.

Further, in cases in which the gradation of the third color is other than zero, the thermal head 37 is controlled by modulation of the energizing time in accordance with the recording information of the third color. The degree of color formation is controlled from a gradation of 1 to a gradation of 255 by supplying to the recording material 33 an amount of heat, e.g., 80 mJ/mm$^2$ to 120 mJ/mm$^2$, which is more than the minimum amount of heat required for formation of the third color and which is increased in a stepwise manner.

FIG. 5 is a plan view of the fluorescent tube print head portion of FIG. 1, and FIG. 6 is a diagram for explaining light amount control at the device of FIG. 1.

The fluorescent tube used in the fluorescent tube print head 45 emits light by illuminating an electron beam or ultraviolet light onto a fluorescent substance. In the fluorescent tube, a plurality of light-emitting portions 57 are arrayed in two lines in the main scanning direction. The light-emitting portion 57 which is one pixel of the fluorescent tube corresponds to one dot of the fluorescent tube print head 45.

Examples of the electron beam emitting type fluorescent tube include a CRT (cathode ray tube), an FED (field emission display) (including an SED (surface-conduction electron emitters display)), and a VFD (vacuum fluorescent device). Examples of the ultraviolet light emitting type fluorescent tube include a fluorescent display tube (thermoelectron emitting tube) and a PDP (plasma display panel). An example of the FED is the structure disclosed in "Nikkei Electronics", No. 678 (1996), page 14, FIG. 2. An example of the fluorescent display tube is the structure disclosed in "Nikkei Electronics", No. 675 (1996), pp. 21–22.

The light spot size of the light-emitting portion 57 corresponds to 150 dpi. The main scanning direction pitch is set to about 170μ, and the subscanning direction length is set to about 200μ. The amount of light of the light-emitting portion 57 is controlled by controlling the light-emitting time. By varying the light-emitting time to 256 different types within a range of 5 mJ/mm$^2$ to 20 mJ/mm$^2$, light recording at 256 gradations is possible.

Further, the light-emitting portions 57 provided in two rows are arranged so as to be staggered such that there are no blank spaces between the dots. Filters 59a, 59b through which electromagnetic waves (ultraviolet rays) of different wavelengths (365 nm, 420 nm) pass are provided at the rows of the light-emitting portions 57, respectively.

Figure 8:
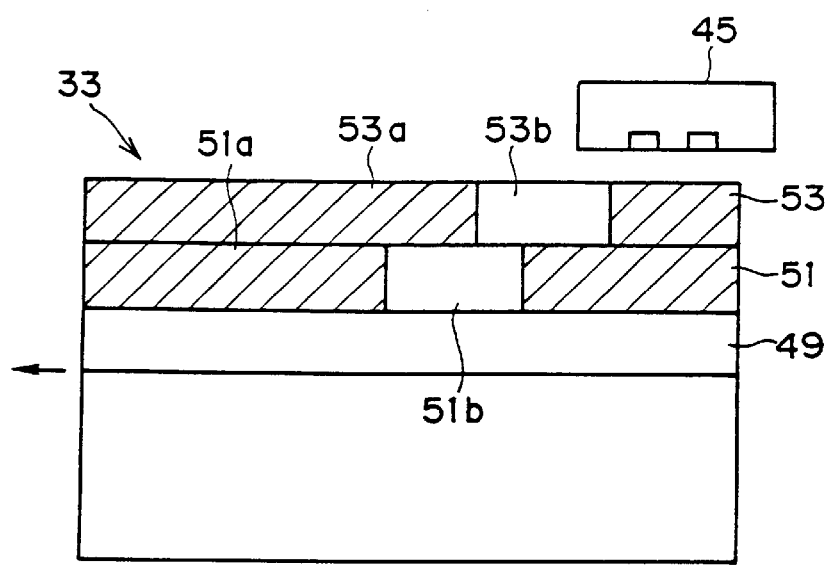
FIGS. 8A and 8B are diagrams for explaining recording processes using the device of FIG. 1.
Figure 8:
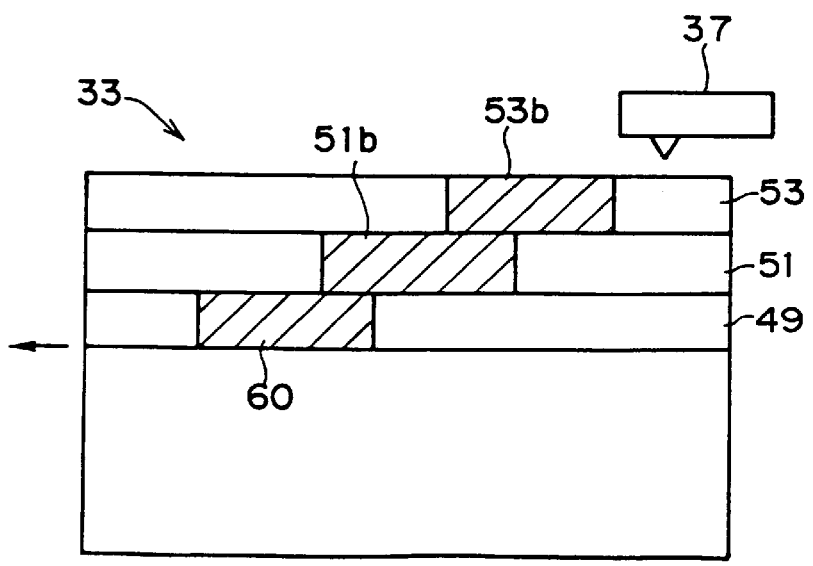

Next, the processes of the direct heat-sensitive recording method using the recording device 31 will be explained on the basis of FIGS. 7 and 8. FIG. 7 is a time chart of the recording processes using the device of FIG. 1, and FIG. 8 is a diagram for explaining the recording processes using the device of FIG. 1.

First, the recording material 33 is supplied toward the fluorescent tube print head 45 from the guide roller 35 side. The fluorescent tube print head 45 simultaneously emits ultraviolet light of 365 nm and 420 nm to the recording material 33 in accordance with the recording information. The reversal image portions of the yellow heat-sensitive recording layer 53 and the magenta heat-sensitive recording layer 51 are thus light-fixed (deactivated) as non-developing portions 53a, 51a, and image portions are deactivated in accordance with gradations of each color. In this way, the yellow heat-sensitive recording layer 53 and the magenta heat-sensitive recording layer 51 remain as undeveloped portions 53b, 51b whose image portions can be heat-sensitive-developed in accordance with recording information.

When the recording material 33, in which the undeveloped portions 53b, 51b remain, reaches the thermal head 37, the undeveloped portions 53b, 51b are this time heat-sensitive-developed by the thermal head 37.

When the cyan heat-sensitive recording layer 49 is at a zero-gradation portion, the thermal head 37 applies to the recording material 33 an amount of heat which is less than the minimum amount of heat needed to develop the cyan heat-sensitive recording layer 49 and which can develop the yellow heat-sensitive recording layer 53 and the magenta heat-sensitive recording layer 51. The undeveloped portions 53b, 51b of the yellow heat-sensitive recording layer 53 and the magenta heat-sensitive recording layer 51 are thus developed.

When the cyan heat-sensitive recording layer 49 is at a portion other than a zero-gradation portion, the amount of heat needed to develop the cyan heat-sensitive recording layer 49 is supplied in accordance with the recording information. The undeveloped portions 53b, 51b of the yellow heat-sensitive recording layer 53 and the magenta heat-sensitive recording layer 51 are developed, and simultaneously, a heat recording 60 is formed on the cyan heat-sensitive recording layer 49.

Due to the above-described processes, recording of the independent three colors, i.e., full color recording, is completed.

In accordance with the image recording method using the recording device 31, the non-developing portions 51a, 51b of the yellow heat-sensitive recording layer 53 and the magenta heat-sensitive recording layer 51 are first light-fixed by the fluorescent tube print head 45. Therefore, the respective heat-sensitive recording layers 53, 51, 49 can be heat-sensitive-developed at one time. As a result, there is no need to convey the recording material 33 reversely or provide a plurality of thermal heads or the like. High-speed recording of images onto a recording material is made possible by a compact and inexpensive device.

Because the recording material 33 is conveyed one time, it is difficult for the recording material 33 to be damaged or for portions of the recording material 33 to not develop due to dirt or the like adhering thereto. It is also difficult for shifts in registration to occur.

Further, as compared with a case in which a plurality of thermal heads are provided, the space between the pinch roller 41 and the recording head 45 can be made small. Therefore, the blank space before the start of recording can be made small.

Next, an image recording device in accordance with another embodiment whose exposing means is structured differently than that of the above-described recording device 31 will be described. Members which are the same as those illustrated in FIG. 1 are denoted by the same reference numerals, and description thereof is omitted.

Figure 9:
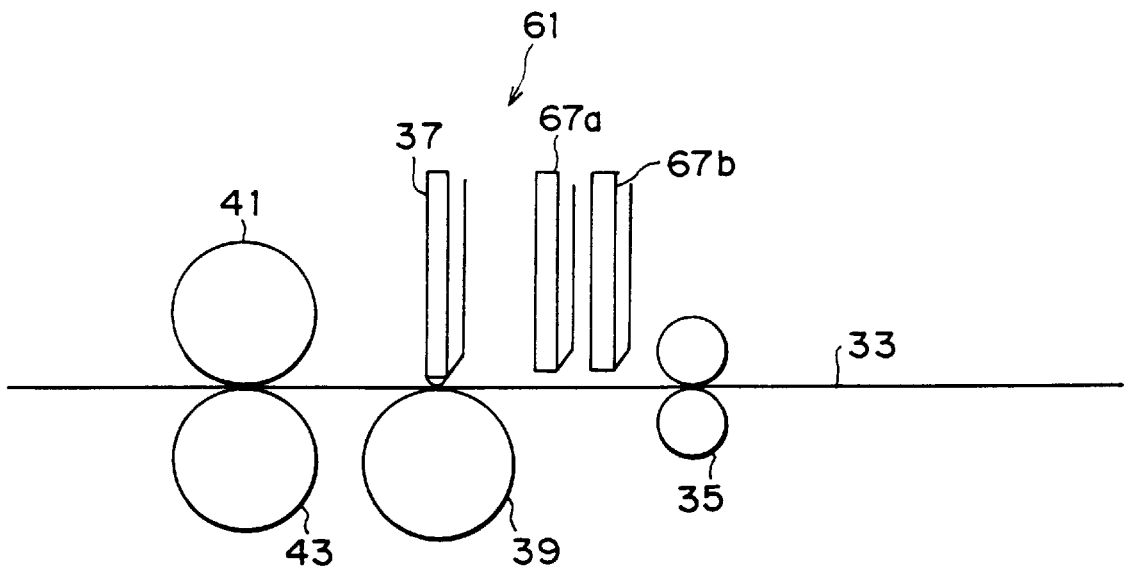
FIG. 9 is a schematic structural view of an image recording device relating to a second embodiment of the present invention.
Figure 10:
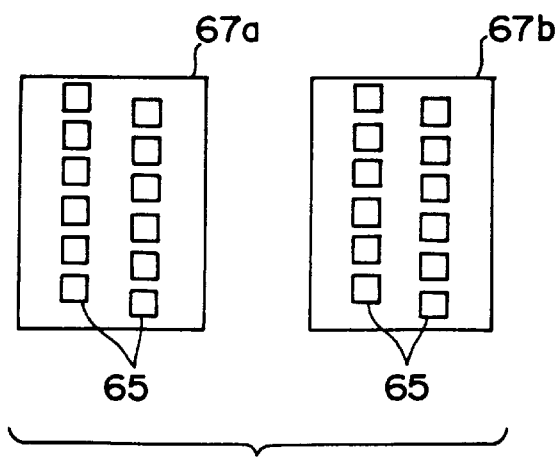
FIG. 10 is a plan view of a fluorescent print head portion of FIG. 9.

FIG. 9 is a schematic structural view of an image recording device 61 relating to the second embodiment of the present invention. FIG. 10 is a plan view of a fluorescent print head portion of FIG. 9. FIG. 11 is a time chart of recording processes using the device of FIG. 9.

In the exposing means of the image recording device 61, fluorescent print heads 67a, 67b, in which a plurality of fluorescent substance light-emitting elements 65 are disposed in a line in the main scanning direction, are provided side by side for ultraviolet light of wavelengths of 365 nm and 420 nm. The emission of light from the respective fluorescent substance light-emitting elements 65 is controlled in accordance with the recording information.

In accordance with the image recording device 61, the fluorescent print heads 67a, 67b directly emit light at ultraviolet light wavelengths of 365 nm and 420 nm, and the fluorescent substance light-emitting elements 65 are arranged in two rows at each of the fluorescent print heads 67a, 67b. Therefore, a sufficient amount of emitted light can be obtained. When actual recording was carried out by using the same recording material 33, as compared with the above-described recording device 31, the recording time could be shortened from 70 seconds to 50 seconds. Therefore, recording could be carried out at an even higher speed.

FIG. 12 is a schematic structural view of an image recording device 71 relating to a third embodiment of the present invention.

In the exposing means of the image recording device 71, LED line heads 73a, 73b, in which a plurality of LED light-emitting elements are disposed in a line in the main scanning direction, are provided side by side for ultraviolet light of wavelengths of 365 nm and 420 nm. The emission of light from the respective LED light-emitting elements is controlled in accordance with the recording information.

In accordance with the image recording device 71, because the LED light-emitting elements directly emit light, a sufficient amount of emitted light can be obtained. In the same way as the image recording device 61 of the second embodiment, the exposure time can be shortened, and high-speed recording is made possible. Further, by using the LED line heads 73a, 73b, the device can be made more compact.

FIG. 13 is a schematic structural view of an image recording device 81 relating to the fourth embodiment of the present invention. The exposing means of the image recording device 81 is formed by two laser light-emitting elements 83a, 83b which emit ultraviolet light of wavelengths of 365 nm and 420 nm, and an optical system 85 which scans the laser beam onto the recording material 33.

The intensity of the light emitted from the laser light-emitting elements 83a, 83b can be modulated in accordance with recording information by a modulating means (not shown). A polygon mirror 85a, an fθ lens 85b, and a mirror 85c are disposed in that order in the optical system 85, such that the laser beam modulated in accordance with the recording information can be scanned onto the recording material 33.

In accordance with the image recording device 81, image formation can be carried out by using a thin laser beam. Therefore, a high resolution can be obtained.

FIG. 14 is a schematic structural view of an image recording device 91 relating to a fifth embodiment of the present invention. FIG. 15 is a plan view of a line control means of FIG. 14.

The exposing means of the image recording device 91 is formed by a linear-light-emitting means (a fluorescent lamp) 93, filters 95a, 95b through which ultraviolet light of wavelengths of 365 nm and 420 nm passes, and a line control means (a liquid crystal matrix) 97 disposed between the filters 95a, 95b and the recording material 33.

The liquid crystal matrix 97 selectively transmits or blocks the light from the fluorescent lamp 93, and the non-developing portions 51a, 53a are light-fixed to the yellow heat-sensitive recording layer 53 and the magenta heat-sensitive recording layer 51 in accordance with the recording information.

In accordance with the image recording device 91, the line control means can be operated by low voltage and a low amount of electrical power.

Figure 17:
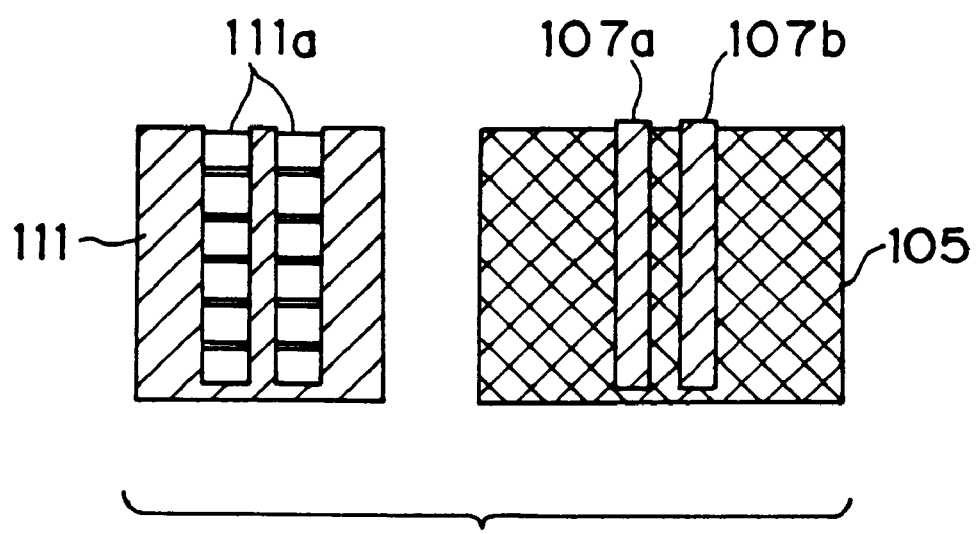
FIG. 17 is a plan view of a line control means of FIG. 16.
Figure 18:
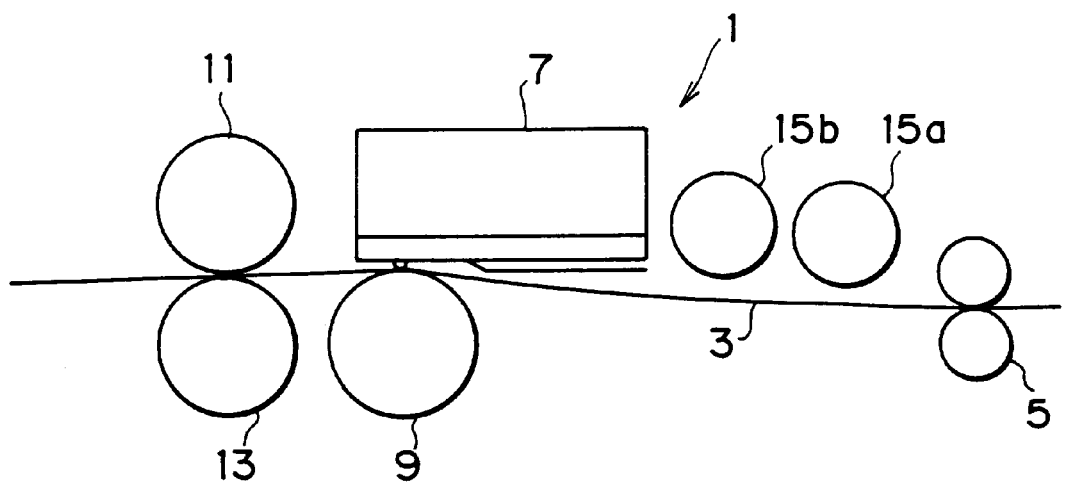
FIG. 18 is a schematic structural view of a conventional image recording device.
Figure 19:
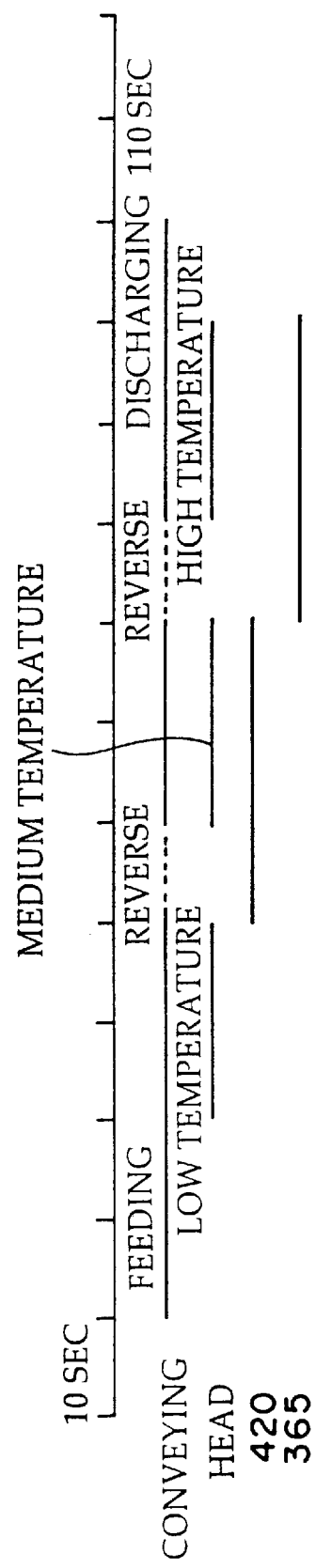
FIG. 19 is a time chart of recording processes using the device of FIG. 18.
Figure 20A:
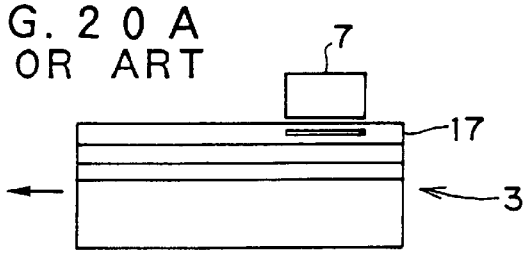
FIGS. 20A through 20E are diagrams for explaining recording processes using the device of FIG. 18.
Figure 20B:
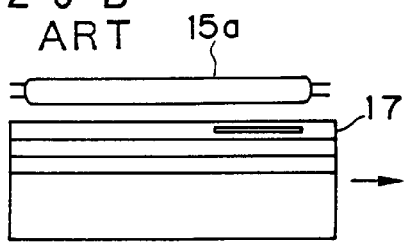
Figure 20C:
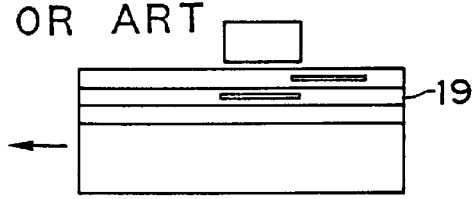
Figure 20D:
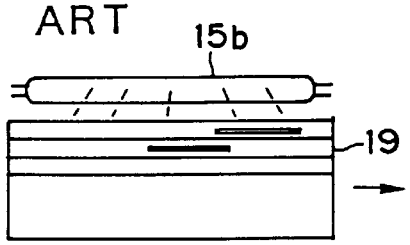
Figure 20E:
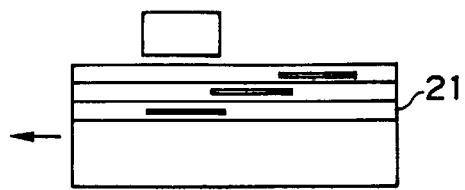
Figure 21:
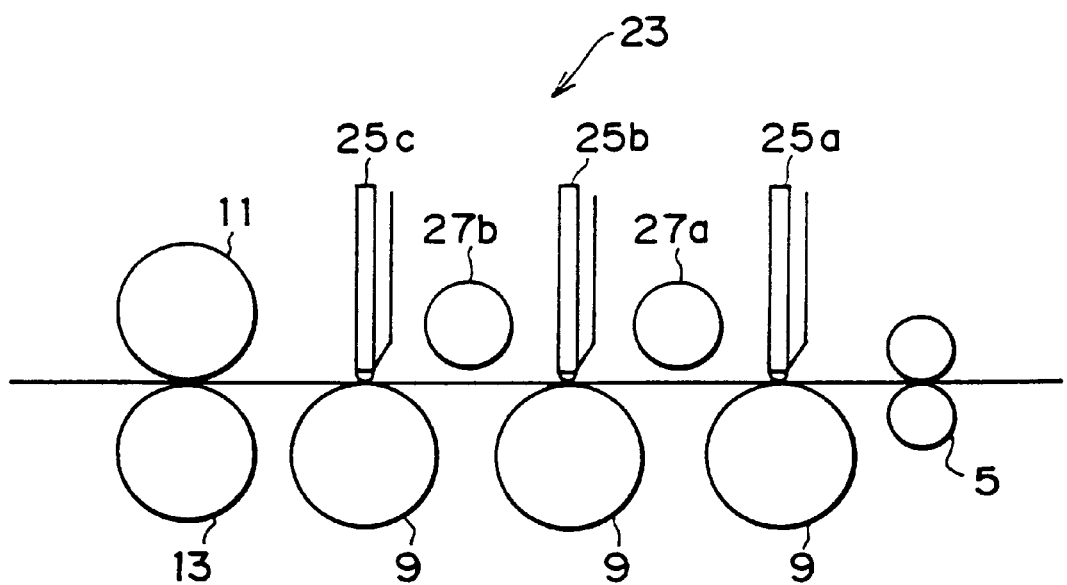
FIG. 21 is a schematic structural view of a conventional image recording device.

FIG. 16 is a schematic structural view of an image recording device 101 relating to a sixth embodiment of the present invention. FIG. 17 is a plan view of a line control means of FIG. 16.

The exposing means of the image recording device 101 is formed by a linear-light-emitting means (a fluorescent lamp) 103, a light-blocking plate 105 disposed between the fluorescent lamp 103 and the recording material 33, filters 107a, 107b which are provided at the two slit openings in the light-blocking plate 105 and through which ultraviolet light of wavelengths of 365 nm and 420 nm is transmitted, a lens 109 disposed between the light-blocking plate 105 and the fluorescent lamp 103, and a line control means (a mirror device) 111 disposed between the lens 109 and the fluorescent lamp 103.

The mirror device 111 is an active semiconductor device having a plurality of mirrors which can deflect light and which are arranged linearly in the main scanning direction. A "deformable mirror device (DMD)" manufactured by Texas Instruments Co. can be used for the mirror device 111. Or, the mirror device may be a structure in which the substantial amount of reflected light is modulated by displacement and not by deflection such as by a DMD. A plurality of mirrors 111a corresponding to one dot are arranged in two rows at the mirror device 111. The angles of reflection of the individual mirrors 111a can be changed in accordance with the recording information.

In the image recording device 101, the individual mirrors 111a of the mirror device 111 are driven on the basis of the recording information. The light from the fluorescent lamp 103 passes through the respective filters 107a, 107b and is illuminated onto the recording material 33 so that the non-developing portions 51a, 53a are light-fixed.

The image recording device 101 uses the mirror device 111 which has a high reflectance and a high aperture ratio, and in which the mirrors 111a are disposed with a minute gap therebetween. Therefore, high energy efficiency can be obtained.

In the above-described embodiments, a TA-method color direct heat-sensitive medium is used for the recording material 33. However, the direct heat-sensitive recording method and device of the present invention are not limited to color images. Namely, monochrome recording is also possible by the same type of device structure if a diazo photosensitive type heat-sensitive medium (Copiart manufactured by Fuji Photo Film Co., Ltd.) is used.

By changing the hues formed from the respective layers, the relationship between the colors of the layers which are light fixable and those which are not can be changed.

More specifically, the following two recording materials may be used in addition to the recording material (hereinafter, "first recording material") having a layer structure in which a cyan heat-sensitive recording layer (an ordinary heat-sensitive recording layer), a magenta heat-sensitive recording layer (a light-fixing-type heat-sensitive recording layer), a yellow heat-sensitive recording layer (a light-fixing-type heat-sensitive recording layer), and a heat-resistant protective layer are layered successively on a substrate: a recording material (hereinafter, "second recording material") having a layer structure in which a yellow heat-sensitive recording layer (an ordinary heat-sensitive recording layer), a cyan heat-sensitive recording layer (a light-fixing-type heat-sensitive recording layer), a magenta heat-sensitive recording layer (a light-fixing-type heat-sensitive recording layer), and a heat-resistant protective layer are layered successively on a substrate; and a recording material (hereinafter, "third recording material") having a layer structure in which a yellow heat-sensitive recording layer (an ordinary heat-sensitive recording layer), a magenta heat-sensitive recording layer (a light-fixing-type heat-sensitive recording layer), a cyan heat-sensitive recording layer (a light-fixing-type heat-sensitive recording layer), and a heat-resistant protective layer are layered successively on a substrate.

By layering the yellow heat-sensitive recording layer at the bottom layer as in the second recording material and the third recording material, images in which graininess is not conspicuous in particular when highlights are recorded can be obtained.

The heat recording sensitivities of the respective layers forming the recording materials are designed such that, at the heat recording characteristic of the first recording material illustrated in FIG. 3, in the second recording material, the magenta heat-sensitive recording layer is recorded at low heat energy, the cyan heat-sensitive recording layer is recorded at medium heat energy, and the yellow heat-sensitive recording layer is recorded at high heat energy. Further, in the third recording material, the heat recording sensitivities are designed such that the cyan heat-sensitive recording layer is recorded at low heat energy, the magenta heat-sensitive recording layer is recorded at medium heat energy, and the yellow heat-sensitive recording layer is recorded at high heat energy.

Further, a material which is substantially insensitive to the amount of exposure and the wavelength of the light used in the image recording of the light-fixing-type heat-sensitive recording layers can be used for the material for color formation of the heat-sensitive layer of the lowest sensitivity in the present invention. The material may be light-fixable with respect to other wavelengths or different amounts of exposure.

Hereinafter, preparation of light-fixing-type heat-sensitive recording materials (the first, second and third recording materials) which are applied to the present invention will be described. The spectral fixing sensitivities of the light-fixing-type heat-sensitive recording layers forming the first recording material are selected such that the main photosensitive wavelength of the yellow heat-sensitive recording layer is 420 nm and the main photosensitive wavelength of the magenta heat-sensitive recording layer is 365 nm. The cyan heat-sensitive recording layer is insensitive to light. The spectral fixing sensitivities of the light-fixing-type heat-sensitive recording layers forming the second recording material are selected such that the main photosensitive wavelength of the magenta heat-sensitive recording layer is 420 nm and the main photosensitive wavelength of the cyan heat-sensitive recording layer is 365 nm. The yellow heat-sensitive recording layer is insensitive to light. The spectral fixing sensitivities of the light-fixing-type heat-sensitive recording layers forming the third recording material are selected such that the main photosensitive wavelength of the cyan heat-sensitive recording layer is 420 nm and the main photosensitive wavelength of the magenta heat-sensitive recording layer is 365 nm. The yellow heat-sensitive recording layer is insensitive to light. The respective light-fixing-type heat-sensitive recording materials are prepared as follows.

First Recording Material

1. Preparation and Application of Cyan Layer Suspension

1-A. Preparation of Capsules for Cyan Layer

A mixed solution of 30 g of ethyl acetate, 8.0 g of the leuco dye of following Formula (1), 8 g of Millionate MR-200 (trade name, produced by Japan Polyurethane Co., Ltd.), and 15 g of Takenate D110N (trade name, produced by Takeda Chemical Industries, Ltd.) was added to a mixed aqueous solution of 60 g of phthalic acid-treated gelatin (8%), 2 g of sodium dodecylbenzensulfonate (10%), and 50 g of water. The resultant mixture was emulsified by a homogenizer manufactured by Nippon Seiki Co., Ltd. Thereafter, 1 g of diethylenetriamine was added, a reaction took place for 3 hours at 50° C., and a capsule suspension having an average particle diameter of 1.2 $\mu$m was obtained.

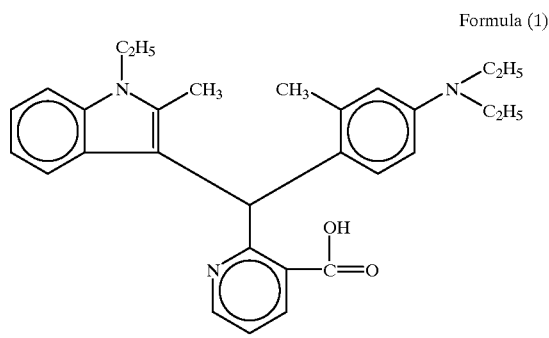

Formula (1)

1-B. Preparation of Developer Emulsion for Cyan Layer

A mixture of 15 g of the developer of following Formula (2), 11 g of phthalic acid-treated gelatin (8%), 30 g of water, and 2 g of sodium dodecylbenzensulfonate (10%) was dispersed by a ball mill for 10 hours. After dispersion, 15 g of lime-treated gelatin (15%) was added, and an emulsion having an average particle diameter of 0.7 $\mu$m was obtained.

Formula (2)

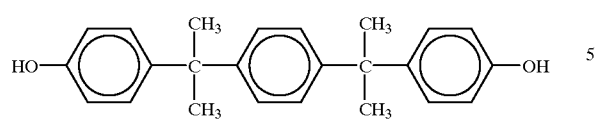

Formula (4)

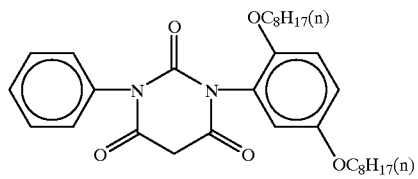

Formula (5)

HO—⟨C₆H₄⟩—C(CH₃)₂—⟨C₆H₄⟩—C(CH₃)₂—⟨C₆H₄⟩—OH

Formula (6)

(structure with H₇C₃O, H₃C, CH₃, OC₃H₇(n) groups on spirobiindane)

1-C. Preparation and Application of Application Suspension for Cyan Layer

An application suspension was prepared by adding 25 g of the capsule suspension for the cyan layer, 100 g of the developer emulsion for the cyan layer, and 50 g of lime-treated gelatin (15%). The application suspension was applied onto a polyethylene-laminated support for photography which contained TiO$_2$, such that the dried layer thickness of the application suspension was 7 μm.

2. Application of the Gelatin Intermediate Layer (Cyan-Magenta Intermediate Layer)

2-A. A mixture was prepared, was applied onto the support onto which the cyan layer had already been applied, and was allowed to dry, such that the lime-treated gelatin solid content was 3 g/m$^2$, the sodium dodecylbenzensulfonate was 0.002 g/m$^2$, and the polyvinylpyrrolidone was 0.17 g/m$^2$.

3. Preparation and Application of Magenta Layer Suspension

3-A. Preparation of Capsules for Magenta Layer 3.5 g of the compound of following Formula (3), 5.3 g of diphenyl phthalate, 8 g of Takenate D-110N (trade name, manufactured by Takeda Chemical Industries, Ltd.), and. 20 g of ethyl acetate were mixed and dissolved. This mixture was added to a mixed solution of 70 g of 8% phthalic acid-treated gelatin and 70 g of water. The resultant mixture was homogenized and emulsified by an ace homogenizer manufactured by Nippon Seiki Co., Ltd., and thereafter was allowed to react for 3 hours at 40° C. so that 0.40 μm capsules were prepared.

Formula (3)

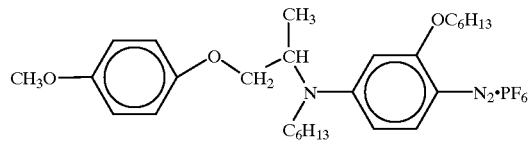

3-B. Preparation of Coupler Emulsion for Magenta Layer

A solution, in which was dissolved 40 g of ethyl acetate, 10 g of the compound of following Formula (4), 16 g of triphenyl guanidine, 16 g of the compound of following Formula (5), 8 g of the compound of following Formula (6), 3 g of tricresyl phosphate, and 5 g of sodium dodecylbenzensulfonate, was added to a mixed solution of 200 g of lime-treated, ion-exchange-treated gelatin (15%) and 180 g of water. The resultant mixture was emulsified by a mixer for household use, and an emulsion having an average particle size of 0.6 μm was obtained.

3-C. Preparation and Application of Application Suspension for Magenta Layer 10 g of the capsules for the magenta layer and 30 g of the coupler emulsion for the magenta layer were mixed together. This mixture was applied, so as to become 6.0 g/m$^2$ at the dried layer thickness, onto a support to which the cyan layer and the gelatin intermediate layer had already been applied.

4. Application of Gelatin Intermediate Layer (Magenta-Yellow Intermediate Layer)

The gelatin intermediate layer (cyan-magenta intermediate layer), which was obtained in the above-described "Application of Gelatin Intermediate Layer (Cyan-Magenta Intermediate Layer)", was applied under the same conditions to the support to which the cyan layer and the gelatin intermediate layer and the magenta layer had already been applied.

5. Preparation and Application of Yellow Layer Suspension

5-A. Preparation of Capsules for Yellow Layer

A capsule suspension of an average particle size of 0.40 μm was obtained in the same way as the capsules for the magenta layer, which were obtained by the above-described "Preparation of Capsules for Magenta Layer", except that 4 g of following Formula (7) was used in place of the 3.5 g of the compound of Formula (3).

Formula (7)

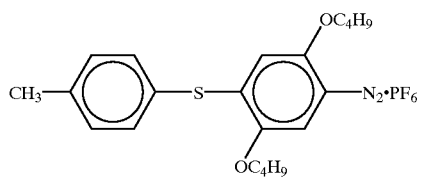

5-B. Preparation of Coupler Emulsion for Yellow Layer

An emulsion of an average particle size of 0.6 μm was obtained in the same way as the coupler emulsion for the magenta layer, which was obtained by the above-described "Preparation of Coupler Emulsion for Magenta Layer", except that 10 g of following Formula (8) was used in place of the 10 g of the compound of Formula (4).

Formula (8)

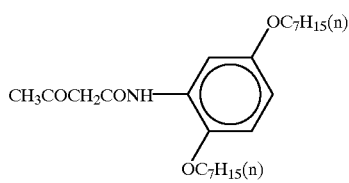

5-C. Preparation and Application of Application Suspension for Yellow Layer 10 g of the capsules for the yellow layer and 30 g of the coupler emulsion for the yellow layer were mixed together. This mixture was applied, so as to be 5.5 g/m² at a dried layer thickness, onto the support to which the cyan layer and the gelatin intermediate layer and the magenta layer and the gelatin intermediate layer had already been applied.

6. Preparation and Application of Protective Layer Suspension

A protective layer suspension, in which were mixed 800 g of 10% polyethylene denatured polyvinylalcohol (RS-106 manufactured by Kuraray Co., Ltd.), 54 g of a 5% aqueous solution of perfluoroalkyl carboxylate (Megafic F120 manufactured by Dainippon Ink), 70 g of sodium (4-nonylphenoxytrioxyethylene)butylsulfonate (2%), 40 g of a zinc stearate dispersion (20%), and 60 g of a kaolin dispersion (30%) of an average particle size of 5 μm, was applied, such that the dried solid content thereof was 1.5 g/m², onto the support onto which the cyan layer, the gelatin intermediate layer, the magenta layer, the gelatin intermediate layer, and the yellow layer had already been applied.

Second Recording Material

1. Preparation and Application of Yellow Layer Suspension

1-A. Preparation of Capsules for Yellow Layer

A mixed solution of 30 g of ethyl acetate, 8.0 g of the diazonium salt of following Formula (9), 14 g of diisopropyl naphthalene, 2 g of dibutyl phthalate, and 15 g of Takenate D110N (produced by Takeda Chemical Industries, Ltd.) was added to a mixed aqueous solution of 120 g of phthalic acid-treated gelatin (8%), 1 g of sodium dodecylbenzensulfonate (10%), and 50 g of water. The resultant mixture was emulsified by a homogenizer manufactured by Nippon Seiki Co., Ltd. A reaction took place for 3 hours at 40° C., and a capsule suspension having an average particle diameter of 0.5 μm was obtained.

Formula (9)

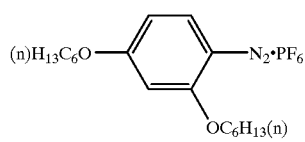

1-B. Preparation of Coupler Emulsion for Yellow Layer

A mixed solution of 50 g of ethyl acetate, 15 g of the coupler of following Formula (10), 15 g of triphenyl guanidine, 10 g of the compound of following Formula (11), 5 g of the compound of following Formula (12), and 6 g of calcium dodecylbenzensulfonate (70%) was added to a mixed aqueous solution of 300 g of lime-treated gelatin (15%) and 150 g of water. The resultant mixture was emulsified by a homogenizer manufactured by Nippon Seiki Co., Ltd. The ethyl acetate was removed under reduced pressure, and an emulsion having an average particle diameter of 0.3 μm was obtained.

Formula (10)

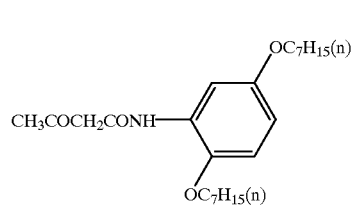

Formula (11)

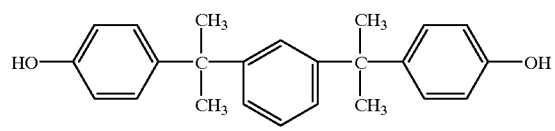

Formula (12)

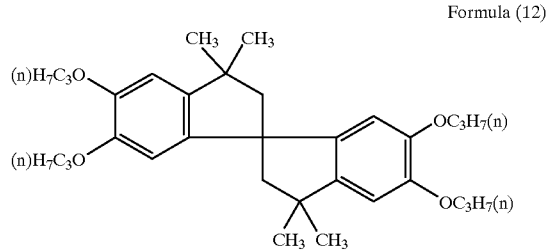

1-C. Preparation and Application of Application Suspension for Yellow Layer 100 g of the capsule suspension for the yellow layer and 350 g of the coupler emulsion for the yellow layer were mixed. This mixture was applied onto a polyethylene-laminated support for photography which contained TiO₂, such that the dried layer thickness was 5.0 μm.

2. Application of the Gelatin Intermediate Layer (Yellow-Cyan Intermediate Layer)

2-A. A mixture was prepared, was applied onto the support onto which the yellow layer had already been applied, and was allowed to dry, such that the lime-treated gelatin solid content was 3 g/m², the sodium dodecylbenzensulfonate was 0.002 g/m², the compound of following Formula (13) was 0.15 g/m², and the polyvinylpyrrolidone was 0.17 g/m².

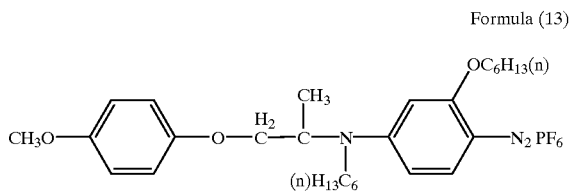

Formula (13)

3. Preparation and Application of Cyan Layer Suspension

3-A. Preparation of Capsules for Cyan Layer

A mixed solution of 20 g of ethyl acetate, 4 g of the compound of Formula (13), 6 g of diphenyl phthalate, and 10 g of Takenate D-110N was added to a mixed aqueous solution of 70 g of phthalic acid-treated gelatin (8%) and 6.5 g of water. The resultant mixture was emulsified, and a reaction took place for 3 hours at 40° C. so that a capsule suspension having an average particle size of 0.38 μm was obtained.

3-B. Preparation of Coupler Emulsion for Cyan Layer

A solution, in which was dissolved 45 g of ethyl acetate, 16 g of the compound of following Formula (14), 16 g of the compound of following Formula (15), 8 g of the compound of following Formula (16), 8 g of the compound of following Formula (12), 2 g of tricresyl phosphate, 1 g of diethyl maleate, and 5 g of calcium dodecylbenzensulfonate, was added to a mixed aqueous solution of 200 g of lime-treated gelatin (15%) and 200 g of water. The resultant mixture was emulsified by the aforementioned homogenizer, the ethyl acetate was removed under reduced pressured, and an emulsion of 0.3 μm was obtained.

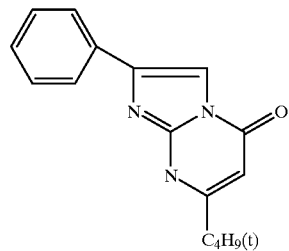

Formula (14)

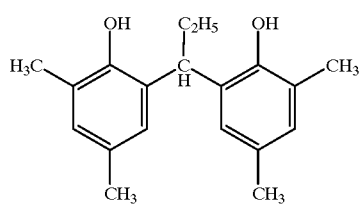

Formula (15)

3-C. Preparation and Application of Application Suspension for Cyan Layer 100 g of the capsule suspension for the cyan layer and 280 g of the emulsion for the cyan layer were mixed together. This mixture was applied, so as to become a dried layer thickness of 6.0 g/m², onto a support to which the yellow layer and the gelatin intermediate layer had already been applied.

4. Application of Gelatin Intermediate Layer (Cyan-Magenta Intermediate Layer)

The same composition as the above-described "gelatin intermediate layer (yellow-cyan intermediate layer)" was applied under the same conditions to the support to which the yellow layer and the gelatin intermediate layer and the cyan layer had already been applied.

5. Preparation and Application of Magenta Layer Suspension

5-A. Preparation of Capsules for Magenta Layer

A capsule suspension of an average particle size of 0.36 μm was obtained in the same way as the formulation for the preparation of capsules for the cyan layer of the above-described "Preparation of Capsules for Cyan Layer", except that 4 g of the compound of following Formula (16) was used in place of the 4 g of the compound of Formula (13).

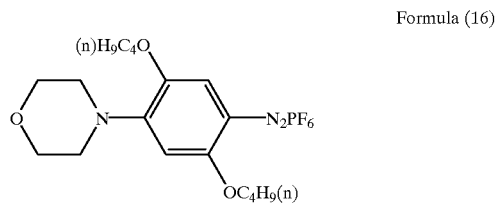

Formula (16)

5-B. Preparation of Coupler Emulsion for Magenta Layer

An emulsion of an average particle size of 0.3 μm was obtained in the same way as in the "Preparation of Coupler Emulsion for Cyan Layer", except that 16 g of the compound of following Formula (17) was used in place of the 16 g of the compound of Formula (14).

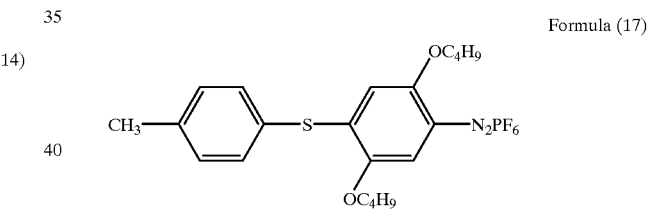

Formula (17)

5-C. Preparation and Application of Application Suspension for Magenta Layer 100 g of the capsule suspension for the magenta layer and 300 g of the emulsion for the magenta layer were mixed together. This mixture was applied, so as to be a dried layer thickness of 5.5 g/m², onto the support to which the yellow layer and the gelatin intermediate layer and the cyan layer and the gelatin intermediate layer had already been applied.

6. Preparation and Application of Protective Layer Suspension

A protective layer suspension, in which were mixed 800 g of 10% polyethylene denatured polyvinylalcohol (RS-6 manufactured by Kuraray Co., Ltd.), 54 g of a 5% aqueous solution of perfluoroalkyl carboxylate (Megafic F120 manufactured by Dainippon Ink), 70 g of sodium (4-nonylphenoxytrioxyethylene)butylsulfonate (2%), 40 g of a zinc stearate dispersion (20%), and 60 g of a kaolin dispersion (30%) of an average particle size of 5 μm, was applied, such that the dried solid content thereof was 1.5 g/m², onto the support onto which the yellow layer, the gelatin intermediate layer, the cyan layer, the gelatin intermediate layer, and the magenta layer had already been applied.

Third Recording Material

The third recording material was prepared by inverting the order in which the cyan layer and the magenta layer were disposed in the preparation of the second recording material.

What is claimed is:

1. A direct heat-sensitive recording device comprising:
    a light-fixing-type heat-sensitive recording material including a plurality of layers, said layers of said light-fixing-type heat-sensitive recording material including:
        a support;
        a heat-sensitive recording layer disposed on said support; and
        at least one light-fixing-type heat-sensitive recording layer, said light-fixing-type heat-sensitive recording layer being disposed on said heat-sensitive recording layer, said light-fixing-type heat-sensitive recording layer having heat recording sensitivities higher than a heat recording sensitivity of said heat-sensitive recording layer and which are fixed by electromagnetic waves of respectively different wavelengths,
    wherein each of said layers of said light-fixing type heat-sensitive recording material develops to a respectively different color, said direct heat-sensitive recording device comprising:
        exposing means for light-fixing image portions as undeveloped portions of each of said light-fixing-type heat-sensitive recording layers corresponding to respective colors by modulating light amounts of electromagnetic waves having respectively different wavelengths and illuminating the electromagnetic waves onto said light-fixing-type heat-sensitive recording layer; and
        heat recording means for developing image portions of said heat-sensitive recording layer and developing said undeveloped portions of said light-fixing-type heat-sensitive recording layer by applying to said light-fixing-type heat-sensitive recording material heat energy needed to develop said heat-sensitive recording layer.

2. A direct heat-sensitive recording device according to claim 1, wherein a heat amount of the heat energy applied to said light-fixing-type heat-sensitive recording material is modulated on a basis of an energization time to supply an amount of heat energy to enable color formation, to said light-fixing-type heat-sensitive recording material, which is less than a minimum heat energy needed to develop said heat-sensitive recording layer and to develop said light-fixing-type heat-sensitive recording layer.

3. A direct heat-sensitive recording device according to claim 1, wherein said exposing means comprises:
    a fluorescent tube which emits light;
    a plurality of filters through which light from said fluorescent tube passes and which filters said light into the electromagnetic waves having respectively different wavelengths which fix said heat recording sensitivities; and
    a plurality of light-emitting portions which are arranged linearly in a main scanning direction for each of said filters.

4. A direct heat-sensitive recording device according to claim 1, wherein said light-fixing image portions of said exposing means are fluorescent substance light-emitting elements which are arranged linearly in a main scanning direction for each of the electromagnetic waves.

5. A direct heat-sensitive recording device according to claim 1, wherein said light-fixing image portions of said exposing means are light emitting diodes which are arranged linearly in a main scanning direction for each of the electromagnetic waves.

6. A direct heat-sensitive recording device according to claim 1, wherein said exposing means comprises:
    laser light-emitting elements which modulate a laser beam in accordance with recording information; and
    an optical system which scans a modulated laser beam onto said light-fixing-type heat-sensitive recording material.

7. A direct heat-sensitive recording device according to claim 1, wherein said exposing means comprises a linear-light-emitting means and a line control element.

8. A direct heat-sensitive recording device according to claim 7, wherein said line control element is a liquid crystal matrix.

9. A direct heat-sensitive recording device according to claim 7, wherein said line control element is an active semiconductor device having a plurality of mirrors which are arranged linearly in a main scanning direction and which can either one of deflect the electromagnetic waves and displace the plurality of mirrors.

10. A direct heat-sensitive recording device according to claim 2, wherein said heat recording means is a thermal head whose energization time is controllable and which has a plurality of heat-emitting elements arranged linearly in said head in a main scanning direction of said recording device.

* * * * *